United States Patent Office 3,553,215
Patented Jan. 5, 1971

3,553,215
TETRAHYDRIC ISOCYANURATE
Edmund J. Zalewski and Manuel A. Jordan, Schenectady, N.Y., assignors to Schenectady Chemicals, Inc., Schenectady, N.Y., a corporation of New York
No Drawing. Filed Mar. 12, 1969, Ser. No. 806,709
Int. Cl. C07d 55/14
U.S. Cl. 260—248                    3 Claims

ABSTRACT OF THE DISCLOSURE

Compounds are prepared having the formula

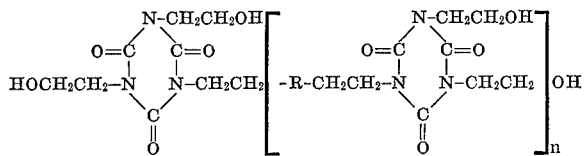

where R is

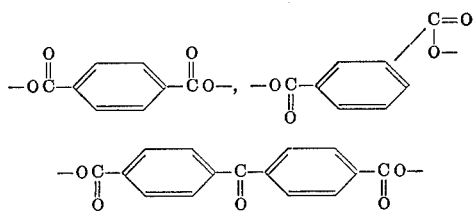

or

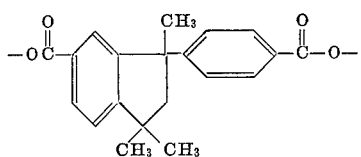

Preferably R is the residue of terephthalic acid, and $n$ is an integer from 1 to 6.

---

The present invention relates to the production of esters of tris(2-hydroxyethyl) isocyanaurate.

It is an object of the present invention to prepare novel monomeric esters of tris(2-hydroxyethyl) isocyanurate.

Another object is to prepare monomeric and oligomeric esters of tris-2-hydroxyethyl) isocyanaurate which are useful in preparing high temperature resistant polyesters and polyimides.

Still further objects and the entire scope of applicability of the present invention will become apparent from the detailed description given thereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

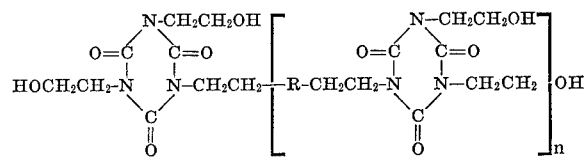

where R is

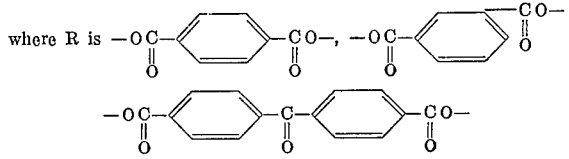

or

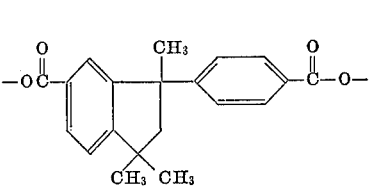

Preferably R is the residue of terephthalic acid, and $n$ is an integer from 1 to 6.

The monomeric and oligomeric esters of the present invention are prepared by reacting 2 moles of tris(2-hydroxyethyl) isocyanurate with 1 mole of the appropriate aromatic dicarboxylic acid, specifically terephthalic acid, isophthalic acid, 4,4'-benzophenone dicarboxylic acid or 1,1,3-trimethyl-5-carboxy-3-(p-carboxyphenyl) indane (commonly called phenylindane dicarboxylic acid). Gel Permeation Chromatography data shows that the product is a mixture of compounds of the formula above where $n$ is from 1 to 6.

The mixture of monomeric and oligomeric ester obtained can be used as such or the mixture can be separated into its individual components thus the monomeric ester can be separated by Gel Permeation Chromatography.

The esters of the present invention are useful in making polyesters and alkyd resins, useful as molding compounds, encapsulating compounds, insulating varnishes, etc. They can also be used to make polyester imides useful as wire enamels, etc.

Thus, an alkyd resin can be prepared by heating 1 mole of a compound of the present invention, e.g. bis(trishydroxyethyl isocyanuryl) terephthalate with 1 mole of terephthalic acid at 430 to 490° F. The alkyd resin prepared can be molded to form a cup or can be used in solution to make wire enamels and electrical conductors coated therewith to form coated wire having good resistance to heat aging or the solutions can be used to impregnate cloth, paper, asbestos and the like. The alkyd resins prepared from the novel tetrahydric alcohols of the present invention can be employed in general wherever alkyd resins are used.

Oil modified alkyd resins can be made from the compounds of the present invention by adding terephthalic acid, with or without adipic acid, and drying oil to the novel tetrahydric alcohols and heating. They can be reacted with isocyanates, e.g. toluene diisocyanate, to form foamed polyurethanes useful as insulation.

In forming the novel esters of the present invention it is critical that the tris(2-hydroxyethyl) isocyanurate and aromatic dicarboxylic acid be heated in the molar ratio of 2:1. If smaller amounts of isocyanurate are employed then rather than forming the compounds of the invention there is a tendency to directly form resinous products. Excess tris(2-hydroxyethyl) isocyanurate over the 2:1 mole ratio can be used but the excess will remain in the product and reduce oligomer formation. Thus 4 moles of tris(2-hydroxyethyl) isocyanurate can be used with 1 mole of terephthalic acid.

Unless otherwise indicated all parts and percentages are by weight.

EXAMPLE 1

Tris(2 - hydroxyethyl) isocyanurate—1044 grams (4 moles)

Terephthalic acid—332 grams (2 moles)

The tris(2-hydroxyethyl) isocyanurate was heated to 275° F. and then the terephthalic acid was added and the mixture heated to 442° F. in 30 minutes. Water began distilling at about 440° F. and the mixture was then heated at 440–470° F. for a period of about 3 hours while removing the water formed by distillation. In all 68 cc. of water were removed. The product having an acid number of 8.11 was poured out while hot from the reaction vessel and allowed to cool to form a solid having an M.P. of 78° C. The monomer product having the formula set forth supra was separated by Gel Permeation Chromatography and had a M.P. of 86° C.

EXAMPLE 2

2088 grams (8 moles) of tris (2-hydroxyethyl) isocyanurate was heated to 250–275° F. and then 664 grams (4 moles) of terephthalic acid added and the mixture heated to 432° F. at which point water began to distill off. Heating was continued at 412 to 464° F. for about 7 hours while removing 135 cc. of water. The product having an acid number of 4.71 was poured hot from the reaction vessel and allowed to cool to form a solid having an M.P. of 80° C.

The monomeric ester having 4 hydroxyl groups prepared in Examples 1 and 2 and having the formula set forth supra is bis(trishydroxyethyl isocyanuryl) terephthalate.

What is claimed is:

1. A compound having the formula

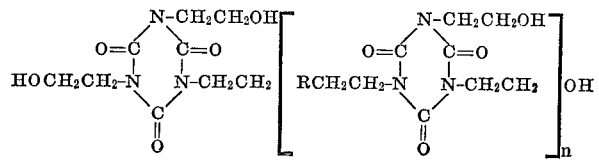

where R is

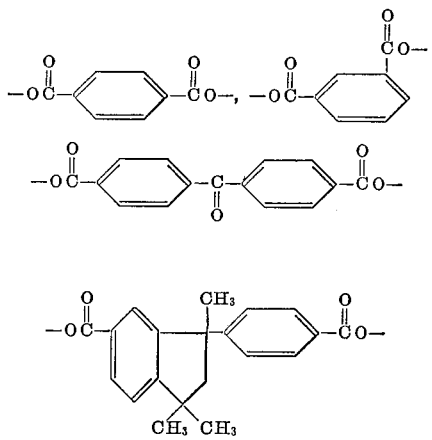

and $n$ is an integer from 1 to 6.

2. A compound according to claim 1 which is bis(trishydroxyethyl isocyanuryl) terephthalate.

3. A compound according to claim 1 where R is

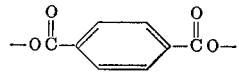

References Cited

UNITED STATES PATENTS 3,249,607  5/1966  Taub et al. _____ 260—248

FOREIGN PATENTS 829,302  12/1969  Canada _____ 260—248

JOHN M. FORD, Primary Examiner

U.S. Cl. X.R.

260—2.5, 75; 117—128.4, 161, 145